United States Patent [19]

Sanns, Jr. Frank

[11] Patent Number: 4,965,293

[45] Date of Patent: Oct. 23, 1990

[54] POLYUREA ELASTOMERS WITH IMPROVED SURFACE QUALITY

[75] Inventor: Sanns, Jr. Frank, Pittsburgh, Pa.

[73] Assignee: Mobay Corporation, Pittsburgh, Pa.

[21] Appl. No.: 362,917

[22] Filed: Jun. 8, 1989

[51] Int. Cl.$^5$ .............................................. C08G 18/14
[52] U.S. Cl. .................................... 521/124; 524/783;
 252/182.26; 264/51; 264/328.1; 264/328.6;
 264/328.8
[58] Field of Search .................... 521/124; 524/783;
 252/182.26; 264/51, 328.1, 328.6, 328.8

[56] References Cited

U.S. PATENT DOCUMENTS

| | | | |
|---|---|---|---|
| 3,726,952 | 4/1973 | Boden et al. | 264/48 |
| 4,058,492 | 11/1977 | von Bonin et al. | 260/2.5 |
| 4,098,731 | 7/1978 | von Bonin et al. | 521/51 |
| 4,396,729 | 8/1983 | Dominquez et al. | 521/51 |
| 4,433,067 | 2/1984 | Rice et al. | 521/51 |
| 4,444,910 | 4/1984 | Rice et al. | 521/51 |
| 4,519,965 | 5/1985 | Taylor et al. | 264/51 |
| 4,530,941 | 7/1985 | Turner et al. | 521/176 |
| 4,581,386 | 4/1986 | Taylor et al. | 521/125 |
| 4,764,540 | 8/1988 | Dewhurst et al. | 521/110 |
| 4,774,263 | 9/1988 | Weber et al. | 521/51 |

FOREIGN PATENT DOCUMENTS 1365215 5/1972 United Kingdom .

Primary Examiner—Maurice J. Welsh
Attorney, Agent, or Firm—Joseph C. Gil; Thomas W. Roy

[57] ABSTRACT

The present invention is directed to a process for the production of optionally cellular, polyurea elastomer moldings by reacting a mixture containing (I) a polyisocyanate component having an isocyanate content of about 10 to 30% by weight which comprises an isocyanate-terminated prepolymer prepared by reacting a polyisocyanate with a non-fatty, hydroxy polyester having a hydroxyl functionality of 1 to 4 and a molecular weight of about 500 to 4000, provided that if the hydroxy polyester is based on an aliphatic monocarboxylic acid, the aliphatic monocarboxylic acid is a non-fatty monocarboxylic acid containing less than 12 carbon atoms, (II) a polyether having at least two isocyanate-reactive groups and a molecular weight of 1800 to 12,000 in which at least 50% of the isocyanate-reactive groups are primary and/or secondary amino groups, and (III) abotu 5 to 50% by weight, based on the weight of component (II) of a chain extender comprising a sterically hindered aromatic diamine, the reaction mixture being processed as a one-shot system by the RIM process at an isocyanate index of about 70 to 130.

The present invention is also directed to an isocyanate-reactive component for use in a RIM process based on components, (II), (III), (IV) and (V) and to an internal mold release agent mixture based on components (IV) and (V) and, optionally, (III). finally, the present invention is directed to the optionally cellular polyurea elastomers prepared by the above process.

38 Claims, No Drawings

POLYUREA ELASTOMERS WITH IMPROVED SURFACE QUALITY

BACKGROUND OF THE INVENTION

1. Field of the Invention

The present invention is directed to a process for the preparation of optionally cellular polyurea elastomer moldings which have improved surface quality and to the polyurea elastomers prepared by this process.

2. Description of the Prior Art

Reaction injection molding processes for the production of optionally cellular polyurea elastomers have been described in U.S. Pat. Nos. 4,433,067, 4,444,910 and 4,530,941. U.S. Pat. No. 4,774,263 is directed to the production of polyurea elastomers using a mold release agent. This reference discloses that suitable mold release agents are the salts of fatty acids having at least 12 carbon atoms and either primary mono-, di- or polyamines containing 2 or more carbon atoms or amines containing amide or ester groups and having at least one primary, secondary or tertiary amino group according to U.S. Pat. No. 3,726,952; blends of two or more of the following in accordance with British Pat. No. 1,365,215: (1) esters of monofunctional and/or polyfunctional carboxylic acids which contain -COOH and/or -OH groups and have OH or acid numbers of at least 5, (2) natural or synthetic oils, fats or waxes and (3) salts according to U.S. Pat. No. 3,726,952; salts of saturated or unsaturated aliphatic or cycloaliphatic carboxylic acids having at least 8 carbon atoms and tertiary amines which do not contain amide or ester groups in accordance with U.S. Pat. No. 4,098,731; and reaction products of ricinoleic acid and long chain fatty acids in accordance with U.S. Pat. No. 4,058,492. In addition, U.S. Pat. Nos. 4,396,729 and 4,764,540 disclose polysiloxane-based internal mold release agents for use in the production of polyurea elastomers.

Finally, U.S. Pat. Nos. 4,519,965 and 4,581,386 are directed to the use of internal mold release agent mixtures for either polyurethane and/or polyurea elastomers which are based on a zinc carboxylate and a solubilizer to maintain the zinc carboxylate in solution in the isocyanate-reactive component used to prepare the elastomer. One of the problems associated with the use of zinc carboxylates as mold release agents for the production of polyurea elastomers is that the surfaces of the resulting elastomers are unacceptably porous and rough.

An object of the present invention is to overcome these difficulties and improve the surface quality of polyurea elastomers prepared using zinc carboxylates as the mold release agent. This object can be achieved in accordance with the present invention as described hereinafter.

SUMMARY OF THE INVENTION

The present invention is directed to a process for the production of optionally cellular, polyurea elastomer moldings by reacting a mixture containing (I) a polyisocyanate, (II) a polyether having at least two isocyanate-reactive groups and a molecular weight of 1800 to 12,000 in which at least 50% of the isocyanate-reactive groups are primary and/or secondary amino groups, (III) about 5 to 50% by weight, based on the weight of component (II), of a chain extender comprising a sterically hindered aromatic diamine, (IV) about 0.5 to 10% by weight, based on the weight of components (II) and (III), of a zinc carboxylate containing 8 to 24 carbon atoms per carboxylate group and (V) about 0.5 to 10% by weight, based on the weight of components (II) and (III), of an active hydrogen-containing fatty acid ester having a molecular weight of about 500 to 5000 and prepared by reacting an alcohol with an aliphatic, saturated or unsaturated fatty acid, said ester being characterized in that at least one aliphatic acid which contains more than eight carbon atoms is built into the molecule, said ester further characterized as having an acid number of 0 to 100 and a hydroxyl number of 0 to 150 with at least one of said numbers being greater than 0, wherein the zinc carboxylate and the fatty acid ester may each be initially blended with either component (II), component (III) or a mixture thereof and the reaction mixture is processed as a one-shot system by the RIM process at an isocyanate index of about 70 to 130.

The present invention is also directed to an isocyanate-reactive component for use in a RIM process based on components (II), (III), (IV) and (V) and to an internal mold release agent mixture based on components (IV) and (V) and, optionally, (III). Finally, the present invention is directed to the optionally cellular polyurea elastomers prepared by the above process.

DETAILED DESCRIPTION OF THE INVENTION

As used herein, the term "polyurea" refers not only to pure polyureas, i.e., polyisocyanate polyaddition products prepared exclusively from polyisocyanates and polyamines, but also to polyisocyanate polyaddition products prepared from polyamines and other compounds containing isocyanate-reactive groups such as polyhydroxyl compounds, provided that at least 50% of the isocyanate-reactive groups are primary and/or secondary amino groups.

The polyisocyanate component (I) to be used in accordance with the present invention may be an aliphatic, cycloaliphatic, araliphatic or preferably an aromatic polyisocyanate, i.e., a polyisocyanate in which all of the isocyanate groups are aromatically bound. Examples of aromatic polyisocyanates include 2,4- and/or 2,6-diisocyanatotoluene; 2,2'-, 2,4'- and/or 4,4'-diisocyanatodiphenylmethane, mixtures of the last-mentioned isomers with their higher homologs (such as those obtained by phosgenating aniline/formaldehyde condensates); compounds containing urethane groups obtained as products of reaction of the above-mentioned di- and/or polyisocyanates with subequivalent quantities of aliphatic polyhydroxyl compounds having molecular weights of 62 to 700, (e.g. ethylene glycol, trimethylol propane, propylene glycol, dipropylene glycol or polypropylene glycols within the above-mentioned molecular weight range); di- and/or polyisocyanates modified by the partial carbodiimidization of the isocyanate groups of the above-mentioned di- and/or polyisocyanates; methyl-substituted diisocyanates of the diphenyl methane series or mixtures thereof (for example, those described in European Published Application No. 0,024,665); or any mixtures of such aromatic di- and polyisocyanates.

Included among the preferred isocyanate starting materials are the derivatives of 4,4'-diisocyanatodiphenylmethane which are liquid at room temperature. Specific examples of such compounds are polyisocyanates containing urethane groups obtainable according to German Patent No. 1,618,380 (U.S. Pat. No. 3,644,457) by reacting one mole of 4,4'-diisocyanatodiphenylmethane with about 0.05 to 0.3 moles of low molecular weight diols or triols, preferably polypropylene glycols having a molecular weight below 700; and diisocyanates based on 4,4'-diisocyanatodiphenylmethane containing carbodiimide and/or uretone imine groups such as those disclosed in U.S. Pat. Nos. 3,152,162, 3,384,653, 3,449,256, and 4,154,752, and German Offenlegungsschrift No. 2,537,685. Also included among the preferred polyisocyanates are the corresponding modification products based on mixtures of 2,4'- and 4,4'-diisocyanatodiphenylmethane or mixtures of the above-described modified 4,4'-diisocyanatodiphenylmethanes with minor quantities of higher than difunctional polyisocyanates of the diphenylmethane series. Such polyisocyanates are described in German Offenlegungsschrift No. 2,624,526. The preferred polyisocyanates are generally polyisocyanates or polyisocyanate mixtures of the diphenylmethane series which are liquid at room temperature and have optionally been chemically modified as described above, have an average isocyanate functionality of 2 to 2.2 (preferably 2) and contain 4,4'-diisocyanatodiphenylmethane as the main component (preferably in an amount of more than 50% by weight).

Another group of preferred polyisocyanates are semi-prepolymers based on the above-mentioned monomeric polyisocyanates with subequivalent quantities of non-fatty, hydroxy polyesters. It has been disclosed in co-pending application. Attorney's Docket No. Mo-3175, that the use of these polyester-based semi-prepolymers (in place of the urethane group-containing polyisocyanates generally used for the preparation of RIM elastomers) results in polyurea elastomers which are not brittle at demold, even when processed at conventional mold temperatures. The semi-prepolymers have an isocyanate content of about 10 to 30% by weight, preferably about 15 to 25%. The polyisocyanate component generally contains at least 20% by weight, preferably at least 30% by weight and more preferably at least 40% by weight of these polyester-based prepolymers in order to obtain molded elastomers which are not brittle.

The hydroxy polyesters generally have a hydroxyl functionality of 1 to 4, preferably 2 to 3 and more preferably 2, and a molecular weight of about 500 to 4000, preferably about 500 to 2500. The hydroxy polyesters are based on the reaction products of polyhydric, preferably dihydric alcohols to which trihydric alcohols may be added, and mono- or polybasic, preferably dibasic carboxylic acids. Instead of free mono- or polycarboxylic acids, the corresponding mono- or polycarboxylic acid anhydrides or mono- or polycarboxylic acid esters of lower alcohols or mixtures thereof may be used for preparing the polyesters. The mono- or polycarboxylic acids may be aliphatic, cycloaliphatic, aromatic and/or heterocyclic and may be unsaturated and/or substituted, e.g. by halogen atoms. The aliphatic monocarboxylic acids are preferably non-fatty carboxylic acids containing less than 12, preferably 8 or less carbon atoms. Saturated, aliphatic dicarboxylic acids are preferred. Examples of suitable acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimethyl terephthalate and bis-glycol terephthalate. Suitable polyhydric alcohols include ethylene glycol, propylene glycol-(1,2) and -(1,3), butylene glycol-(1,4) and -(2,3), hexane diol-(1,6), octane diol-(1,8), neopentyl glycol, cyclohexane dimethanol (1,4-bis-hydroxymethyl-cyclohexane), 2-methyl-1,3-propane diol, glycerol, trimethylol propane, hexane triol-(1,2,6), butane triol-(1,2,4), trimethylol ethane, triethylene glycol, tetraethylene glycol, polyethylene glycols, dipropylene glycol, polypropylene glycol, dibutylene glycol and polybutylene glycols. The polyesters may also contain a proportion of carboxyl end groups. Polyesters of lactones, e.g. ε-caprolactam, or hydroxy carboxylic acids, e.g. ω-hydroxy caproic acid, may also be used. The semi-prepolymers are prepared in known manner by adding a sufficient amount of the hydroxy polyester to the polyisocyanate to achieve the desired NCO content. It is also possible to mix the hydroxy polyester with a portion of the polyisocyanate to form an isocyanate-terminated prepolymer which is subsequently mixed with additional quantities of the polyisocyanate or a different polyisocyanate.

The polyethers (component II) to be used in accordance with the present invention contain at least two isocyanate-reactive groups in end positions and have an average molecular weight (calculated from the functionality and the isocyanate-reactive group content) of about 1800 to 12,000, preferably about 2000 to 8000. At least about 50 equivalent %, preferably about 80 to 100 equivalent % of the isocyanate-reactive end groups are primary and/or secondary (preferably primary) aromatically or aliphatically bound amino groups with the remainder being primary and/or secondary aliphatically bound hydroxyl groups. When polyether mixtures are used, individual components of the mixture may have a molecular weight below 1800 (for example between 500 and 1800), provided that the average molecular weight of the mixtures is within the range of 1800 to 12,000. The use of mixtures containing large quantities of individual components which have molecular weights below 1800 is, however, not preferred, even when the average molecular weight is within the disclosed ranges.

Compounds containing amino end groups may be prepared by the conversion of existing end groups or they may be attached to the polyether chain by urethane, ether or ester groups. Suitable polyether polyols for preparing the amine-terminated polyethers are known and disclosed in U.S. Pat. Nos. 4,305,857 and 4,218,543, both of which are herein incorporated by reference.

The "amino polyethers" may be prepared by known methods. One such method is the amination of polyhydroxy polyethers (e.g., polypropylene glycol ethers) by reaction with ammonia in the presence of Raney nickel and hydrogen (Belgium Patent No. 634,741). U.S. Pat. No. 3,654,370 discloses the preparation of polyoxyalkylene polyamines by reaction of the corresponding polyol with ammonia and hydrogen in the presence of a nickel, copper or chromium catalyst. The preparation of polyethers containing amino end groups by the hydrogenation of cyanoethylated polyoxypropylene ethers is described in German Patent No. 1,193,671. Other methods for the preparation of polyoxyalkylene (polyether) amines are described in U.S. Pat. Nos. 3,155,728 and 3,236,895 and French Patent No. 1,551,605. French Patent No. 1,466,708 discloses the preparation of polyethers containing secondary amino end groups.

Relatively high molecular weight polyhydroxy polyethers suitable for the process of the present invention may be converted into the corresponding anthranilic acid esters by reaction with isatoic acid anhydride. German Offenlegungsschriften No. 2,019,432 and 2,619,840 and U.S. Pat. Nos. 3,808,250; 3,975,428; and 4,016,143 disclose methods for making polyethers containing aromatic end groups.

Relatively high molecular weight compounds containing amino end groups may be obtained according to German Offenlegungsschrift No. 2,546,536 or U.S. Pat. No. 3,865,791 by reacting isocyanate prepolymers based on polyhydroxy polyethers with hydroxyl-containing enamines, aldimines or ketimines and hydrolyzing the reaction product.

Amino polyethers which have been obtained by the hydrolysis of compounds containing isocyanate end groups (U.S. Pat. No. 4,774,263, herein incorporated by reference in its entirety) are preferred starting materials and can be used alone or in admixture with other amino polyethers, especially those obtained by the amination of polyether polyols. To prepare these hydrolyzed amino polyethers, polyethers preferably containing two or three hydroxyl groups are reacted with excess quantities of polyisocyanates to form isocyanate-terminated prepolymers and the isocyanate groups are then converted in a second step into amino groups by hydrolysis. Other patents relating to the preparation of these amino polyethers include U.S. Pat. Nos. 4,532,317; 4,506,039; 4,540,270; 4,565,645; 4,525,534; 4,515,923; 4,525,590; 4,501,873; 4,578,500; 4,386,218; 4,472,568; 4,532,266; and 4,456,730. Additional methods are disclosed in European Patent Application Nos. 217,247; 178,525; 97,299; 75,770; 219,035; and 218,053.

Also preferred are polyethers containing amino phenoxy end groups and having a low viscosity. These aminopolyethers may be economically prepared in accordance with German Offenlegungsschrift No. 3,713,858, and may be used alone or in admixture with the other previously described aminopolyethers.

The "amino polyethers" used in accordance with the present invention are in many cases mixtures of the compounds described above. These mixtures generally should contain (on a statistical average) two to three isocyanate-reactive end groups. In the process of the present invention, the "amino polyethers" may also be used as mixtures with polyhydroxy polyethers which are free from amino groups (such as those previously disclosed as precursors for the amino polyethers, or highly branched polyether polyols having an average hydroxyl functionality of about 3 to 6 and molecular weights of about 500 to 1000), although such mixtures are less preferred. If such mixtures are used, however, it is necessary to ensure that at least about 50 equivalent % of the isocyanate reactive groups present in the mixture are primary and/or secondary amino groups. It is also possible to use mixed amino/hydroxyl polyethers, i.e., polyethers containing both amino and hydroxyl groups, provided that at least 50% of the isocyanate-reactive groups in the polyether component are primary and/or secondary amino groups. These mixed amino/hydroxyl polyethers may be prepared, e.g., by aminating only a portion of the hydroxyl groups of a polyether polyol.

Suitable chain extenders (component III) include the known low molecular isocyanate-reactive compounds such as aromatic polyamines, especially diamines, having molecular weights of less than about 800, preferably less than about 500.

Preferred chain extenders include the sterically hindered aromatic diamines which contain at least one linear or branched alkyl substituent in the ortho position to the first amino group and at least one, preferably two, linear or branched alkyl substituents containing at least one, preferably one to three carbon atoms in the ortho position to the second amino group. These aromatic diamines include 1-methyl-3,5-diethyl-2,4-diaminobenzene, 1-methyl-3,5-diethyl-2,6-diaminobenzene, 1,3,5-trimethyl-2,4-diaminobenzene, 1-methyl-5-t-butyl-2,4-diaminobenzene, 1-methyl-5-t-butyl-2,6-diaminobenzene, 1,3,5-triethyl-2,4-diaminobenzene, 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane, 3,3'-diethyl-5,5'-diisopropyl-4,4'-diaminodiphenylmethane, 1-methyl-2,6-diamino-3-isopropylbenzene and mixtures of the above diamines. Most preferred are mixtures of 1-methyl-3,5-diethyl-2,4-diaminobenzene and 1-methyl-3,5-diethyl-2,6-diaminobenzene in a weight ratio between about 50:50 to 85:15, preferably about 65:35 to 80:20.

In addition, unhindered aromatic polyamines may be used in admixture with the sterically hindered chain extenders and include 2,4- and/or 2,6-diaminotoluene, 2,4'- and/or 4,4'-diaminodiphenylmethane, 1,2- and 1,4-phenylene diamine, naphthalene-1,5-diamine and triphenyl methane-4,4',4"-triamine. The difunctional and polyfunctional aromatic amine compounds may also exclusively or partly contain secondary amino groups such as 4,4'-di-(methylamino)-diphenylmethane or 1-methyl-2-methylamino-4-aminobenzene. Liquid mixtures of polyphenyl polymethylene polyamines of the type obtained by condensing aniline with formaldehyde are also suitable. Generally the nonsterically hindered aromatic diamines and polyamines are too reactive to provide sufficient processing time in a RIM system. Accordingly, these diamines and polyamines should be used in combination with one or more of the previously mentioned sterically hindered diamines.

The chain extender (III) is used in quantities of about 5 to 50%, preferably about 8 to 30% and most preferably about 12 to 26% by weight, based on the weight of the high molecular weight isocyanate-reactive component (II).

In addition to components I, II and III, the compositions according to the present invention also contain metallic carboxylates (IV), preferably zinc carboxylates, as internal mold release agents. Suitable metallic carboxylates which may be used in accordance with the present invention are based on $C_8-C_{24}$ branched or straight chain fatty acids which may be saturated or unsaturated, preferably saturated. The carboxylates also include the commercial preparations of a specific carboxylate which also contains impurities or by-products of other fatty acid derivatives. For example, commercial "stearates" may also contain significant quantities of palmitates, myristates, etc. and commercial "tall oil" derivatives normally contain mixtures of stearates, palmitates, oleates, etc. Examples of preferred zinc carboxylates include zinc stearate, zinc oleate, zinc octoate, zinc laurate, zinc behenate and zinc ricinoleate; zinc stearate is especially preferred. In view of the large quantities of amine-terminated polyethers used in accordance with the present invention, it is not necessary to add low molecular weight compatibilizers as disclosed in U.S. Pat. No. 4,519,965; however, these compatibilizers (disclosed at columns 4 and 5 of U.S. Pat. No. 4,519,965, herein incorporated by reference) may be included in the compositions according to the present invention. The metallic carboxylates are generally used in amounts of about 0.5 to 10% by weight, preferably about 1 to 6% by weight and more preferably about 1 to 4% by weight, based on the weight of components (II) and (III). The metallic carboxylates may be incorporated into component (II), component (III) or mixtures thereof.

In accordance with the present invention active hydrogen-containing fatty acid esters are incorporated into component (II), component (III) or mixtures thereof in order to improve the surface quality of the polyurea elastomers. The fatty acid esters may first be blended with the metallic carboxylates (IV) to form an internal mold release agent mixture prior to incorporating this mixture into components (II) and/or (III). However, the metallic carboxylates and fatty acid esters may also be added separately or one may be added to component (II) and one may be added to component (III).

Suitable fatty acid esters to be incorporated in accordance with the present invention are those in which at least one aliphatic acid which contains more than eight carbon atoms is built into the molecule and which have acid numbers of 0 to 100, preferably 0 to 40 and hydroxyl numbers of 0 to 150, preferably 0 to 75, wherein at least one of these two values is greater than 0. The fatty acid esters are generally present in an amount of about 0.5 to 10% by weight, preferably about 1 to 6% by weight and more preferably about 1 to 4% by weight, based on the weight of components (II) and (III), in order to improve the surface quality of the polyurea elastomers.

The fatty acid esters used may also have the character of polyesters or mixed esters and may be prepared both from monofunctional and polyfunctional carboxylic acids and/or alcohols. The fatty acid esters may be prepared from several different types of fatty acids or carboxylic acids and/or alcohols so that fatty acid esters with an average molecular weight of about 500 to about 5000, preferably about 800 to 3000, are obtained by the process of mixed condensation.

Amines (blended with alcohols) or amino alcohols (optionally blended with alcohols) may also be used in the preparation of fatty acid esters and result in fatty acid mixed esters which contain basic or amide groups. These mixed esters are suitable for the process according to the invention. Such mixed esters can be obtained by using ammonia, monoalkyl amines or dialkylamines or their alkoxylation products (for example with ethylene oxide, propylene oxide or higher epoxides), or by using acid amides which contain carboxyl groups or alcohol groups. These acid amides may also be obtained by the amidation of carboxylic acids with monoalkanolamines or dialkanolamines such as ethanolamine, diethanolamine, propanolamine, dipropanolamine or the like. The fatty acid esters used for the reaction with the polyisocyanates are preferably those which can be prepared by esterifying carboxylic acids with alcohols or which can be obtained from natural substances. Suitable examples of alcohols include those set forth for the preparation of the polyester precursors of the polyisocyanate component and also butanol, hexanol, octanol isomers, dodecanol, oleyl alcohol, other fatty alcohols, natural or synthetic steroid alcohols, ricinoleic acid, pentaerythritol, sorbitol, hexitol, various sugars or addition products of alkylene oxides (such as ethylene oxide or propylene oxide) with these alcohols, and the like. Glycerol, trimethylol propane, pentaerythritol and sorbitol are particularly suitable.

The carboxylic acids used may be saturated or unsaturated, preferably aliphatic, and include octane carboxylic acids, dodecane acids, natural fatty acids such as ricinoleic acid, oleic acid, alaidic acid, stearic acid, palmitic acid, linoleic acid, linolenic acid, train oil fatty acids, fatty acids obtained from coconut oil, tallow fatty acids or fatty acids obtained by paraffin oxidation, tall oil fatty acids, succinic acid, maleic acid, citric acid, azelaic acid, adipic acid or higher dicarboxylic and polycarboxylic acids, oligomerization products of unsaturated carboxylic acids and addition products of maleic acid with natural and synthetic oils, and the like. The following are particularly suitable: oleic acid, linoleic acid, ricinoleic acid and adipic acid.

Preparation of the fatty acid esters is most suitably carried out by the co-condensation of the alcohols and acids at temperature above 100° C., preferably at about 120° to 180° C., optionally in a vacuum, the process of the elimination of water being continued until the desired hydroxyl and acid numbers or average molecular weights have been obtained. The process of esterification may, of course, be catalyzed with acid or basic catalysts and the water may be eliminated by azeotropic distillation. The products prepared and used according to the invention preferably contain hydroxyl and/or carboxylic acid groups.

Fatty acid esters which have been found to be particularly suitable for the process are the cocondensates of oleic acid with a dicarboxylic acid (such as adipic acid) and a polyfunctional alcohol (such as pentaerythritol), which have molecular weights of about 900 to 2500, hydroxyl numbers of about 30 to 70 and acid numbers of about 3 to 30.

There is not always a direct stoichiometric connection between the acid numbers and the hydroxyl numbers obtained and the molar ratios of the components used, possibly because side reactions of unknown type take place with the esterification.

Castor oil and ricinoleic acid polyesters which have a molecular weight of between 800 and 2500 are also of particular interest.

Auxiliary agents and additives including additional internal mold release agents, reinforcing agents, blowing agents, catalysts, surface active additives (emulsifiers and foam stabilizers), reaction retarders, cell regulators, fillers, pigments, flame retardant agents, age resistors, stabilizers to protect against weathering, plasticizers, fungistatic and bacteriostatic substances, may also be included in the compositions according to the present invention. Examples of these types of auxiliary agents and additives are set forth in U.S. Pat. Nos. 4,254,228 and 4,581,386, both of which are herein incorporated by reference in their entireties. In addition, these additives have been described in Kunststoff-Handbuch, Vol. VI, published by Vieweg and Hochtlen, Carl-Hanser-Verlag, Munich, 1966, e.g. on pages 103 to 113.

The compositions according to the present invention may be molded using conventional RIM processing techniques. In general, two separate streams are intimately mixed and subsequently injected into a suitable mold, although it is possible to use more than two streams. The first stream contains the polyisocyanate component (I), while the second stream contains the high molecular weight isocyanate-reactive component (II), the chain extender (III), the chain extender (IV), the fatty acid ester (V) and generally any other additive which is to be included.

Prior to use, a mixture is prepared from components (II), (III), (IV) and (V) to form a second stream and agitated briefly to ensure homogeneity. If used, a reinforcing agent may be added to the mixture at this time.

The invention is further illustrated, but is not intended to be limited by the following examples in which all parts and percentages are by weight unless otherwise specified.

EXAMPLES

Description of Materials

Polyol A: A TMP/water-initiated (4.5:1 wt. ratio) hydroxy polyoxypropylene having an OH number of 56 and a functionality of 2.4.

Polyol B: A glycerine-initiated poly(oxyalkylene)-polyether triol having an OH number of 35 and prepared from 4.6% propylene oxide followed by 4.7% ethylene oxide, followed by 82.3% propylene oxide and, finally 8.4% ethylene oxide.

Polyol C: A mixture of two parts of Polyol A with one part of Polyol B.

Polyol D: A polyester polyol having a molecular weight of 2000 and based on adipic acid and a mixture of ethylene glycol and butylene glycol in a 1:1 molar ratio.

Polyol E: A glycerine-initiated poly(oxyalkylene)-polyether triol having an OH number of 28 and prepared from 83 wt. % propylene oxide followed by 17 % ethylene oxide.

Amine-Terminated Polyether A: 1 mole of Polyol C was reacted with 2.6 moles of 2,4-toluylene diisocyanate to form an isocyanate-terminated prepolymer and the terminal isocyanate groups were subsequently converted to primary amino groups.

Amine-Terminated Polyether B: A blend of aliphatically-bound amine-terminated polyoxypropylenes having an average equivalent weight of about 1,000, an average functionality of about 2.5 and supplied by Texaco Chemical Company as Jeffamine LMT-3001.

Amine-Terminated Polyether C: 1 mole of Polyol E was reacted with 3 moles of 2,4-toluylene diisocyanate to form an isocyanate-terminated prepolymer and the terminal isocyanate groups were subsequently converted to primary amino groups.

Chain Extender A: A commercial preparation of diethyl toluene diamine (DETDA) which is an isomeric mixture of 1-methyl-3,5-diethyl-2,4-diamino-benzene and 1-methyl-3,5-diethyl-2,6-diamino-benzene in a ratio between 65:35 and 80:20.

Cross-Linker A: An amine-initiated poly(oxyalkylene)polyether tetrol having a hydroxyl number of about 630 and obtained by the addition of about 5 moles of propylene oxide to one mole of ethylene diamine.

Fatty Acid Ester A: Castor oil supplied as DB Oil by CasChem.

Fatty Acid Ester B: A polyester having an OH number of 50 and an acid number of 5 which was prepared from 2.5 moles of pentaerythritol, 6 moles of oleic acid and 1 mole of adipic acid.

Surfactant A: A commercial silicone surfactant supplied as L 5430 by Union Carbide.

Surfactant B: A commercial silicone surfactant supplied as L-5304 by Union Carbide.

Additive A: A functional silane modifier identified as gamma-glycidoxypropyltrimethoxysilane and supplied by Dow Corning Corporation as Z-6040 or equivalent.

Additive B: Bis-(3-dimethylaminopropyl)-amine.

Additive C: Dimethylformamide (DMF).

Polyisocyanate A: A mixture having an overall isocyanate content of 19% and based on 94% by weight of an isocyanate-terminated prepolymer prepared from 4,4'-diphenyl-methane diisocyanate and Polyol D and 6% by weight of carbodiimidized 4,4'-diphenylmethane diisocyanate having an isocyanate equivalent weight of 143.

Polyisocyanate B: An aniline/formaldehyde condensation product containing 41% of 4,4'-diphenylmethane diisocyanate, 18% of the 2,4'-isomer, 2% of the 2,2'-isomer and the remainder higher functional homologs.

Polyisocyanate C: A mixture of 80 parts of Polyisocyanate A and 20 parts of Polyisocyanate B.

Polyisocyanate D: A liquid semi-prepolymer prepared by reacting 4,4'-diphenylmethane diisocyanate and tripropylene glycol in a molar ratio of about 5:1 to provide a product having an NCO content of about 23% and a viscosity at 25° C. of 725±175 cps.

Polyisocyanate E: An aniline/formaldehyde condensation product containing 44.4% of 4,4'-diphenylmethane diisocyanate, 19% of the 2,4'-isomer, 2.6% of the 2,2'-isomer and the remainder higher functional homologs.

Polyisocyanate F: A blend of 80 parts of Polyisocyanate A and 20 parts of Polyisocyanate E.

Polyisocyanate G: An aniline/formaldehyde condensation product containing 54.4% of 4,4'-diphenylmethane diisocyanate, 2.6% of the 2,4'-isomer and the remainder higher functional homologs.

Polyisocyanate H: A mixture of equal parts of Polyisocyanate A and carbodiimidized 4,4'-diphenylmethane diisocyanate having an isocyanate equivalent weight of 143.

Polyisocyanate I: An isocyanate-terminated prepolymer having an NCO content of 19.2% and based on 38% of Polyol D, 12.4% of Polyisocyanate G and 49.6% of 4,4'-diisocyanatodiphenylmethane.

Polyisocyanate J: A blend of 80 parts of Polyisocyanate A and 20 parts of Polyisocyanate G.

EXAMPLES 1-17:

The resin blends and polyisocyanates set forth in the following table were reacted at an isocyanate index of 105 to form polyurea elastomers. The elastomers were prepared in a Cincinnati Milacron RIM-90 using a plaque tool (P) or in a Cincinnati Milacron RIM-125 using a General Motors door panel (D). The reaction mixtures generally possessed good flowability and the elastomers possessed good green strength and were stiff at demold. After cooling, the elastomers were evaluated for surface quality. Prior to conducting the examples, the surface of the mold was treated with an external soap release agent, ChemTrend RCTW 2006.

| Mixhead Type | Adjustable |
|---|---|
| Injection Rate, pounds per second | 5.1 |
| Part Weight, pound | 5.7 |
| Mold Temperature, °F. | 150 |
| Resin Blend, specific gravity, g/cc | 1.256 |
| Material Temperature, °F. | |
| Polyisocyanate Component | 30 |
| Resin Component | 120–130 |
| Mix Pressures, psi | |
| Polyisocyanate Component | 1900–2000 |
| Resin Blend Component | 2000–2100 |
| Demold Time, seconds | 35 |

| | EXAMPLE NO. | | | | | | | | |
|---|---|---|---|---|---|---|---|---|---|
| | 1 Comp | 2 Comp | 3 | 4 | 5 | 6 | 7 | 8 | 9 |
| Amine-Terminated Polyether A | 65 | 68 | 63 | 63 | 63 | 65.9 | 63 | 65 | 65 |
| Chain Extender A | 28 | 25 | 28 | 28 | 26 | 25.1 | 28 | 26 | 26 |
| Cross-Linker A | 3 | 3 | 3 | 3 | 3 | 3 | 3 | 3 | 3 |
| Zinc Stearate | 2.5 | 2.5 | 2.5 | 2.5 | 2.5 | 2.5 | 2.5 | 2.5 | 2.5 |
| Surfactant | A,1.0 | A,1.0 | B,0.5 | B,075 | B,0.75 | B,0.75 | B,0.75 | B,0.75 | B,0.75 |
| Additive A | 0.5 | 0.5 | 1.0 | 0.75 | 0.75 | 0.75 | 0.75 | 0.75 | 0.75 |
| Fatty Acid Ester A | — | — | 2.0 | 2.0 | 2.0 | 2.0 | 2.0 | 2.0 | 2.0 |
| Flakeglass[1], % | 20 | 25 | 20 | 20 | 20 | 20 | 20 | 20 | 20 |
| Polyisocyanate | A | A | A | A | A | H | I | J | C |
| Mold | P | P | P | D | D | P | P | P | P |

| | EXAMPLE NO. | | | | | | |
|---|---|---|---|---|---|---|---|
| | 10[2] Comp | 11[3] | 12 Comp | 13 | 14 | 15 | 16 |
| Amine-Terminated Polyether | A,66.5 | A,62 | A,67 | B,65 | B,65 | C,68.25 | C,68.25 |
| Chain Extender A | 28 | 28 | 26 | 26 | 26 | 26 | 26 |
| Cross-Linker A | 1 | 3 | 3 | 3 | 3 | 3 | 3 |
| Zinc Stearate | 2.0 | 2.5 | 2.5 | 2.5 | 2.5 | 2 | 2 |
| Surfactant B | 0.75 | 0.75 | 0.75 | 0.75 | 0.75 | 0.75 | 0.75 |
| Additive A | 0.75 | 0.75 | 0.75 | 0.75 | 0.75 | — | — |
| Fatty Acid Ester B | — | 2 | — | 2 | 2 | — | 2 |
| Flakeglass, % | 20 | 20 | 20 | 20 | 20 | 17[4] | 17[4] |
| Polyisocyanate | C | C | C | D | C | F | F |
| Mold | P | P | P | P | P | P | P |

[1] % flakeglass is based on total reaction mixture including polyisocyanate
[2] also contained 1.0 part of Additive B
[3] also contained 1.0 part of Additive C
[4] surface treated mica from Huber In the preceding examples the surface quality of the elastomers which were prepared in accordance with the present invention was much better than the surface quality of the elastomers prepared in the comparison examples, which were porous and rough. Particular attention is directed to Examples 15–16. In Example 15 seven elastomers were prepared from a resin blend which did not contain a fatty acid ester and resulted in elastomers which contained sink marks and light mix worms. Example 16 continued Example 15; however, the next 7 elastomers were prepared from a resin blend which contained the indicated amount of fatty acid ester. The surface of these elastomers did not contain sink marks or mix worms.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an optionally cellular, polyurea elastomer molding which comprises reacting a reaction mixture containing
   (I) a polyisocyanate,
   (II) a polyether having at least two isocyanate-reactive groups and a molecular weight of 1800 to 12,000 in which at least 50% of the isocyanate-reactive groups are primary and/or secondary amino groups,
   (III) about 5 to 50% by weight, based on the weight of component (II), of a chain extender comprising a sterically hindered aromatic diamine and
   (IV) about 0.5 to 10% by weight, based on the weight of components (II) and (III), of a zinc carboxylate containing 8 to 24 carbon atoms per carboxylate group and
   (V) about 0.5 to 10% by weight, based on the weight of components (II) and (III), of an active hydrogen containing fatty acid ester having a molecular weight of about 500 to 5000 and prepared by reacting an alcohol with an aliphatic, saturated or unsaturated fatty acid, said ester being characterized in that at least one aliphatic acid which contains more than eight carbon atoms is built into the molecule, said ester further characterized as having an acid number of 0 to 100 and a hydroxyl number of 0 to 150 with at least one of said numbers being greater than 0,
wherein said zinc carboxylate and said fatty acid ester may each be initially blended with either component (II), component (III) or a mixture thereof and the reaction mixture is processed as a one-shot system by the RIM process at an isocyanate index of about 70 to 130.

2. The process of claim 1 wherein about 80 to 100% of the isocyanate-reactive groups of component (II) are primary and/or secondary amino groups.

3. The process of claim 1 wherein said chain extender comprises an isomeric mixture of 1-methyl-3,5-diethyl- 2,4-diaminobenzene and 1-methyl-3,5-diethyl-2,6-diaminobenzene.

4. The process of claim 1 wherein said fatty acid ester (V) has an acid number of 0 to 40, a hydroxyl number of 0 to 75 and an average molecular weight of about 800 to 3000.

5. The process of claim 1 wherein said alcohol used to prepare said fatty acid ester (V) comprises a low molecular weight polyol having 3 or hydroxyl groups.

6. The process of claim 1 wherein said fatty acid ester (V) comprises the reaction product of a fatty acid, a dicarboxylic acid and a low molecular weight polyol having 3 or more hydroxyl groups, said fatty acid ester having an average molecular weight of about 900 to 2500, a hydroxyl number of about to 70 and an acid number of about 3 to 30.

7. The process of claim 1 wherein said reaction mixture additionally contains a reinforcing agent.

8. A process for the production of an optionally cellular, polyurea elastomer molding which comprises reacting a reaction mixture containing
   (I) a polyisocyanate which is liquid at room temperature,
   (II) a polyether having at least two isocyanate-reactive groups and a molecular weight of about 2000 to 8000 in which about 80% to 100% of the isocyanate-reactive groups are primary and/or secondary amino groups,
   (III) about 5 to 50% by weight, based on the weight of component (II) of a chain extender comprising an isomeric mixture of 1-methyl-3,5-diethyl-2,4-diaminobenzene and 1-methyl-3,5-diethyl-2,6-diaminobenzene,
   (IV) about 0.5 to 10% by weight, based on the weight of components (II) and (III), of a zinc carboxylate containing 8 to 24 carbon atoms per carboxylate group and
   (V) about 2 to 15% by weight, based on the weight of components (II) and (III) of an active hydrogen-containing fatty acid ester having a molecular weight of about 800 to 3000 and prepared by reacting an alcohol with an aliphatic, saturated or unsaturated fatty acid, said ester being characterized in that at least one aliphatic acid which contains more than 8 carbon atoms is built into the molecule, said ester further characterized as having an acid number of 0 to 40 and a hydroxyl number of 0 to 75, with at least one of said numbers being greater than 0,
wherein said zinc carboxylate and said fatty acid ester may each be initially blended with component (II), component (III) or a mixture thereof and the reaction mixture is processed as a one-shot system by the RIM process at an isocyanate index of about 70 to 130.

9. The process of claim 8 wherein said alcohol used to prepare said fatty acid ester (V) comprises a low molecular weight polyol having 3 or more hydroxyl groups.

10. The process of claim 8 wherein said fatty acid ester (V) comprises the reaction product of a fatty acid, a dicarboxylic acid and a low molecular weight polyol having 3 or more hydroxyl groups, said fatty acid ester having an average molecular weight of about 900 to 2500, a hydroxyl number of about to 70 and an acid number of about 3 to 30.

11. The process of claim 8 wherein said reaction mixture additionally contains a reinforcing agent.

12. An isocyanate-reactive component which is suitable for the production of an optionally cellular, polyurea elastomer molding and comprises (I) a polyether having at least two isocyanate-reactive groups and a molecular weight of 1800 to 12,000 in which at least 50% of the isocyanate-reactive groups are primary and/or secondary amino groups,
   (II) about 5 to 50% by weight, based on the weight of component (ii), of a chain extender comprising a sterically hindered aromatic diamine and
   (IV) about 0.5 to 10% by weight, based on the weight of components (II) and (III), of a zinc carboxylate containing 8 to 24 carbon atoms per carboxylate group and
   (V) about 1 to 20% by weight, based on the weight of components (II) and (III), of an active hydrogen-containing fatty acid ester having a molecular weight of about 500 to 5000 and prepared by reacting an alcohol with an aliphatic, saturated or unsaturated fatty acid, said ester being characterized in that at least one aliphatic acid which contains more than 8 carbon atoms is built into the molecule, said ester further characterized as having an acid number of 0 to 100 and a hydroxyl number of 0 to 150 with at least one of said numbers being greater than 0.

13. The isocyanate-reactive component of claim 12 wherein about 80 to 100% of the isocyanate-reactive groups of component (II) are primary and/or secondary amino groups.

14. The isocyanate-reactive component of claim 12 wherein said chain extender comprises an isomeric mixture of 1-methyl-3,5-diethyl-2,4-diamino-benzene and 1-methyl-3,5-diethyl-2,6-diaminobenzene.

15. The isocyanate-reactive component of claim 12 wherein said fatty acid ester (V) has an acid number of 0 to 40, a hydroxyl number of 0 to 75 and an average molecular weight of about 800 to 3000.

16. The isocyanate-reactive component of claim 12 wherein said alcohol used to prepare said fatty acid ester (V) comprises a low molecular weight polyol having 3 or more hydroxyl groups.

17. The isocyanate-reactive component of claim 12 wherein said fatty acid ester (V) comprises the reaction product of a fatty acid, a dicarboxylic acid and a low molecular weight polyol having 3 or more hydroxyl groups, said fatty acid ester having an average molecular weight of about 900 to 2500, a hydroxyl number of about 30 to 70 and an acid number of about 3 to 30.

18. The isocyanate-reactive component of claim 12 which additionally comprises a reinforcing agent.

19. An isocyanate-reactive component which is suitable for the production of an optionally cellular, polyurea elastomer molding and comprises
   (II) a polyether having at least two isocyanate-reactive groups and a molecular weight of about 2000 to 8000 in which about 80% to 100% of the isocyanate-reactive groups are primary and/or secondary amino groups,
   (III) about 5 to 50% by weight, based on the weight of
   isomeric mixture of 1-methyl-3,5-diethyl-2,4-diaminobenzene and 1-methyl-3,5-diethyl-2,6-diaminobenzene and
   (IV) about 0.5 to 10% by weight, based on the weight of components (II) and (III), of a zinc carboxylate containing 8 to 24 carbon atoms per carboxylate group and
   (V) about 2 to 15% by weight, based on the weight of L components (II) and (III), of an active hydrogen-containing fatty acid ester having a molecular weight of about 800 to 3000 and prepared by reacting an alcohol with an aliphatic, saturated or unsaturated fatty acid, said ester being characterized in that at least one aliphatic acid which contains more than 8 carbon atoms is built into the molecule, said ester further characterized as having an acid number of 0 to 40 and a hydroxyl number of 0 to 75, with at least one of said numbers being greater than 0.

20. The isocyanate-reactive component of claim 19 wherein said alcohol used to prepare said fatty acid ester (V) comprises a low molecular weight polyol having 3 or more hydroxyl groups.

21. The isocyanate-reactive component of claim 19 wherein said fatty acid ester (V) comprises the reaction product of a fatty acid, a dicarboxylic acid and a low molecular weight polyol having 3 or more hydroxyl groups, said fatty acid ester having an average molecular weight of about 900 to 2500, a hydroxyl number of about 30 to 70 and an acid number of about 3 to 30.

22. The isocyanate-reactive component of claim 19 which additionally comprises a reinforcing agent.

23. A composition which comprises
   (IV) a zinc carboxylate containing 8 to 24 carbon atoms per carboxylate group and
   (V) an active hydrogen-containing fatty acid ester having a molecular weight of about 500 to 5000 and prepared by reacting an alcohol with an aliphatic, saturated or unsaturated fatty acid, said ester being characterized in that at least one aliphatic acid which contains more than 8 carbon atoms is built into the molecule, said ester further characterized as having an acid number of 0 to 100 and a hydroxyl number of 0 to 150 with at least one of said numbers being greater than 0.

24. The composition of claim 23 which additionally comprises an isomeric mixture of 1-methyl-3,5-diethyl-2,4-diamino-benzene and 1-methyl-3,5-diethyl-2,6-diaminobenzene.

25. The composition of claim 23 wherein said fatty acid ester (V) has an acid number of 0 to 40, a hydroxyl number of 0 to 75 and an average molecular weight of about 800 to 3000.

26. The composition of claim 23 wherein said alcohol used to prepare said fatty acid ester (V) comprises a low molecular weight polyol having 3 or more hydroxyl groups.

27. The composition of claim 23 wherein said fatty acid ester (V) comprises the reaction product of a fatty acid, a dicarboxylic acid and a low molecular weight polyol having 3 or more hydroxyl groups, said fatty acid ester having an average molecular weight of about 900 to 2500, a hydroxyl number of about to 70 and an acid number of about 3 to 30.

28. An optionally cellular, polyurea elastomer molding which is prepared by a process which comprises reacting a reaction mixture containing
   (I) a polyisocyanate,
   (II) a polyether having at least two isocyanate-reactive groups and a molecular weight of 1800 to 12,000 in which at least 50% of the isocyanate-reactive groups are primary and/or secondary amino groups,
   (III) about 5 to 50% by weight, based on the weight of component (II), of a chain extender comprising a sterically hindered aromatic diamine and
   (IV) about 0.5 to 10% by weight, based on the weight of components (II) and (III), of a zinc carboxylate containing 8 to 24 carbon atoms per carboxylate group and
   (V) about 0.5 to 10% by weight, based on the weight of
   components (II) and (III), of an active hydrogen-containing fatty acid ester having a molecular weight of about 500 to 5000 and prepared by reacting an alcohol with an aliphatic, saturated or unsaturated fatty acid, said ester being characterized in that at least one aliphatic acid which contains more than eight carbon atoms is built into the molecule, said ester further characterized as having an acid number of 0 to 100 and a hydroxyl number of 0 to 150 with at least one of said numbers being greater than 0, wherein said zinc carboxylate and said fatty acid ester may each be initially blended with either component (II), component (III) or a mixture thereof and the reaction mixture is processed as a one-shot system by the RIM process at an isocyanate index of about 70 to 130.

29. The elastomer molding of claim 28 wherein about 80 to 100% of the isocyanate-reactive groups of component (II) are primary and/or secondary amino groups.

30. The elastomer molding of claim 28 wherein said chain extender comprises an isomeric mixture of 1-methyl-3,5-diethyl-2,4-diaminobenzene and 1-methyl-3,5-diethyl-2,6-diaminobenzene.

31. The elastomer molding of claim 28 wherein said fatty acid ester (V) has an acid number of 0 to 40, a hydroxyl number of 0 to 75 and an average molecular weight of about 800 to 3000.

32. The elastomer molding of claim 28 wherein said alcohol used to prepare said fatty acid ester (V) comprises a low molecular weight polyol having 3 or more hydroxyl groups.

33. The elastomer molding of claim 28 wherein said fatty acid ester (V) comprises the reaction product of a fatty acid, a dicarboxylic acid and a low molecular weight polyol having 3 or more hydroxyl groups, said fatty acid ester having an average molecular weight of about 900 to 2500, a hydroxyl number of about 30 to 70 and an acid number of about 3 to 30.

34. The elastomer molding of claim 28 wherein said reaction mixture additionally contains a reinforcing agent.

35. An optionally cellular, polyurea elastomer molding which is prepared by a process which comprises reacting a reaction mixture containing
   (I) a polyisocyanate which is liquid at room temperature,
   (II) a polyether having at least two isocyanate-reactive groups and a molecular weight of about 2000 to 8000 in which about 80% to 100% of the isocyanate-reactive groups are primary and/or secondary amino groups,
   (III) about 5 to 50% by weight, based on the weight of component (II) of a chain extender comprising an isomeric mixture of 1-methyl-3,5-diethyl-2,4-diaminobenzene and 1-methyl-3,5-diethyl-2,6-diaminobenzene,
   (IV) about 0.5 to 10% by weight, based on the weight of components (II) and (III), of a zinc carboxylate containing 8 and 24 carbon atoms per carboxylate group and
   (V) about 2 to 15% by weight, based on the weight of components (II) and (III) of an active hydrogen-containing fatty acid ester having a molecular weight of about 800 to 3000 and prepared by reacting an alcohol with an aliphatic, saturated or unsaturated fatty acid, said ester being characterized in that at least one aliphatic acid which contains more than 8 carbon atoms is built into the molecule, said ester further characterized as having an acid number of 0 to 40 and a hydroxyl number of 0 to 75, with at least one of said numbers being greater than 0,
wherein said zinc carboxylate and said fatty acid ester may each be initially blended with component (II), component (III) or a mixture thereof and the reaction mixture is processed as a one-shot system by the RIM process at an isocyanate index of about 70 to 130.

36. The elastomer molding of claim 35 wherein said alcohol used to prepare said fatty acid ester (V) comprises a low molecular weight polyol having 3 or more hydroxyl groups.

37. The elastomer molding of claim 35 wherein said fatty acid ester (V) comprises the reaction product of a fatty acid, a dicarboxylic acid and a low molecular weight polyol having 3 or more hydroxyl groups, said fatty acid ester having an average molecular weight of about 900 to 2500, a hydroxyl number of about 30 to 70 and an acid number of about 3 to 30.

38. The elastomer molding of claim 35 wherein said reaction mixture additionally contains a reinforcing agent.

* * * * *